(12) United States Patent
Bloch et al.

(10) Patent No.: US 8,600,220 B2
(45) Date of Patent: Dec. 3, 2013

(54) SYSTEMS AND METHODS FOR LOADING MORE THAN ONE VIDEO CONTENT AT A TIME

(75) Inventors: Jonathan Bloch, New York, NY (US); Barak Feldman, Tenafly, NJ (US); Tal Zubalsky, Tel-Aviv (IL); Kfir Y. Rotbard, Ramat HaSharon (IL)

(73) Assignee: JBF Interlude 2009 Ltd—Israel (IL)

( * ) Notice: Subject to any disclaimer, the term of this patent is extended or adjusted under 35 U.S.C. 154(b) by 39 days.

(21) Appl. No.: 13/437,164

(22) Filed: Apr. 2, 2012

(65) Prior Publication Data

US 2013/0259442 A1    Oct. 3, 2013

(51) Int. Cl.
*H04N 5/761* (2006.01)
(52) U.S. Cl.
USPC .......................................... 386/296; 386/293
(58) Field of Classification Search
USPC ......... 386/296, 293, 248, 290, 291, 323, 324, 386/341
See application file for complete search history.

(56) References Cited

U.S. PATENT DOCUMENTS

| | | | |
|---|---|---|---|
| 5,607,356 A | 3/1997 | Schwartz | |
| 5,636,036 A | 6/1997 | Ashbey | |
| 5,734,862 A | 3/1998 | Kulas | |
| 6,128,712 A | 10/2000 | Hunt et al. | |
| 6,222,925 B1 | 4/2001 | Shiels et al. | |
| 6,298,482 B1 | 10/2001 | Seidman et al. | |
| 1,002,689 A1 | 2/2011 | Lussier at al. | |

| | | |
|---|---|---|
| 2002/0091455 A1 | 7/2002 | Williams |
| 2002/0120456 A1 | 8/2002 | Berg et al. |
| 2005/0055377 A1 | 3/2005 | Dorey et al. |
| 2005/0102707 A1 | 5/2005 | Schnitman |
| 2006/0150072 A1 | 7/2006 | Salvucci |
| 2007/0118801 A1 | 5/2007 | Harshbarger et al. |
| 2007/0162395 A1 | 7/2007 | Ben-Yaacov et al. |
| 2007/0239754 A1 | 10/2007 | Schnitman |
| 2008/0092159 A1 | 4/2008 | Dmitriev et al. |
| 2008/0300967 A1 | 12/2008 | Buckley et al. |
| 2008/0314232 A1 | 12/2008 | Hansson et al. |
| 2009/0055880 A1 | 2/2009 | Batteram et al. |
| 2009/0063681 A1 | 3/2009 | Ramakrishnan et al. |
| 2009/0199697 A1 | 8/2009 | Lehtiniemi et al. |
| 2009/0228572 A1 | 9/2009 | Wall et al. |
| 2010/0186579 A1 | 7/2010 | Schnitman |

(Continued)

FOREIGN PATENT DOCUMENTS

| | | |
|---|---|---|
| DE | 10053720 A1 | 4/2002 |
| EP | 1033157 A2 | 9/2000 |

(Continued)

OTHER PUBLICATIONS

U.S. Appl. No. 13/838,830, filed Mar. 15, 2013, Systems and Methods for Synchronization of Selectably Presentable.

(Continued)

*Primary Examiner* — Robert Chevalier
(74) *Attorney, Agent, or Firm* — Goodwin Procter LLP

(57) ABSTRACT

A system for loading videos includes an interactive video player is with a loader. A product configuration file in operation configures files for a user in creation of a custom video. External assets are configured for a design of an interactive layer of the video. The interactive video player in operation creates in real-time a custom video that includes a plurality of video segments.

21 Claims, 6 Drawing Sheets

*Regular Video*

→ *Time*

*Interlude Video (with branches)*

→ *Time*

▨ *Downloaded video*
▥ *Played video*
▢ *Remaining video to download*
┼► *Decision point*

(56) References Cited

U.S. PATENT DOCUMENTS

| | | |
|---|---|---|
| 2010/0293455 A1 | 11/2010 | Bloch |
| 2010/0332404 A1 | 12/2010 | Valin |
| 2011/0096225 A1* | 4/2011 | Candelore .................. 348/384.1 |
| 2011/0200116 A1 | 8/2011 | Bloch et al. |
| 2011/0202562 A1 | 8/2011 | Bloch et al. |
| 2012/0198412 A1 | 8/2012 | Creighton et al. |
| 2013/0054728 A1* | 2/2013 | Amir et al. .................... 709/213 |

FOREIGN PATENT DOCUMENTS

| | | |
|---|---|---|
| EP | 2104105 | 9/2009 |
| GB | 2428329 A | 1/2007 |
| WO | WO-00/59224 | 10/2000 |
| WO | WO-2007/062223 | 5/2007 |
| WO | WO-2007/138546 | 12/2007 |
| WO | WO-2008/001350 | 1/2008 |
| WO | WO-2008/057444 | 5/2008 |
| WO | WO-2008052009 A2 | 5/2008 |
| WO | WO-2009/137919 | 11/2009 |

OTHER PUBLICATIONS

International Search Report for International Application PCT/IL2010/000362 mailed Aug. 25, 2010.
Supplemental Search Report for International Application PCT/IL2010/000362 mailed Jun. 28, 2012.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
Labs.byHook: "Ogg Vorbis Encoder for Flash: Alchemy Series Part 1," [Online] Internet Article, Retrieved on Dec. 17, 2012 from the Internet: URL:http://labs.byhook.com/2011/02/15/ogg-vorbis-encoder-for-flash-alchemy-series-part-1/,2011, (6 pages).
International Search Report and Written Opinion for International Application PCT/IB2013/001000 mailed Jul. 31, 2013, 12 pages.
Sodagar, I., (2011) "The MPEG-DASH Standard for Multimedia Streaming Over the Internet", *IEEE Multimedia*, IEEE Service Center, New York, NY, US, vol. 18, No. 4, pp. 62-67.

\* cited by examiner

Download order - 1

Download order - 2

Download order - 3

Download order - 4

Download order - 5

SYSTEMS AND METHODS FOR LOADING MORE THAN ONE VIDEO CONTENT AT A TIME

BACKGROUND OF THE INVENTION

1. Field of the Invention

The present invention is directed to systems and methods for loading video content, and more particularly to systems and methods that load more than one video at the same time.

2. Description of the Related Art

All web servers are capable of progressive download. This is merely the method of delivering a video file via HTTP to a browser on the client side. The process is similar to downloading a file from any website but the difference is that media players can begin to play the video while it is downloading rather than having to wait until the entire video has been downloaded.

When a video is being delivered via HTTP progressive download, typically one sees the buffer bar grow as the video downloads. One is not able to watch the video if the scrubber button is moved past the amount that has downloaded already. This makes it impossible to jump to the end of the video. If the site has a slow web server or limited bandwidth, or the end user is on a slow Internet connection, then the end user will notice buffering. Buffering occurs when the download can't stay ahead of the video playback. In this instance, the video will stop and only after the player will download an additional portion of the video will the playing resume. If the user pauses the video and allows the downloading of a large portion of the video, the user will likely watch the video uninterrupted.

In almost all progressive downloading, there will be a certain amount of preloading, which means that a certain amount of video data is loaded, before the start of playback. Some players will begin to play a video as soon as a small amount of data is received and some will wait until the entire file is downloaded before it plays (in order to prevent buffering).

Current methods load the entire video and just one video is provided. Only after the video is finished playing can another one be loaded.

There is a need to provide improved systems and methods for loading videos. There is a further need for loading more than one video at a time.

SUMMARY OF THE INVENTION

An object of the present invention is to provide systems and methods for improving the loading of videos.

Another object of the present invention is to provide systems and methods for loading more than one video at a time.

Yet another object of the present invention is to provide systems and methods where the several videos are loaded at the same time and played in seamless manner both for audio and video.

Yet another object of the present invention is to provide systems and methods where videos are loaded at the same time in a seamless manner and concatenated on client side.

A further object of the present invention is to provide systems and methods for loading videos where a plurality of videos is loaded, each having a plurality of segments that are standalone videos.

Still another object of the present invention is to provide systems and methods for loading videos that allow a user to create customized videos.

Another object of the present invention is to provide systems and methods that connect the loaded videos seamlessly on client side.

Another object of the present invention is to provide systems and methods for loading videos where a user can create a new customized video using selected segments of an original video.

Still another object of the present invention is to provide systems and methods to create customized videos from a video that is playing.

These and other objects of the present invention are achieved in a system for loading videos. An interactive video player is provided with a loader. A product configuration file in operation configures files for a user in creation of a custom video. External assets are configured for a design of an interactive layer of the video. The interactive video player in operation creates in real-time a custom video that includes a plurality of video segments.

DETAILED DESCRIPTION OF THE PREFERRED EMBODIMENTS

Definitions

Player

Player Engine

Figure 1:
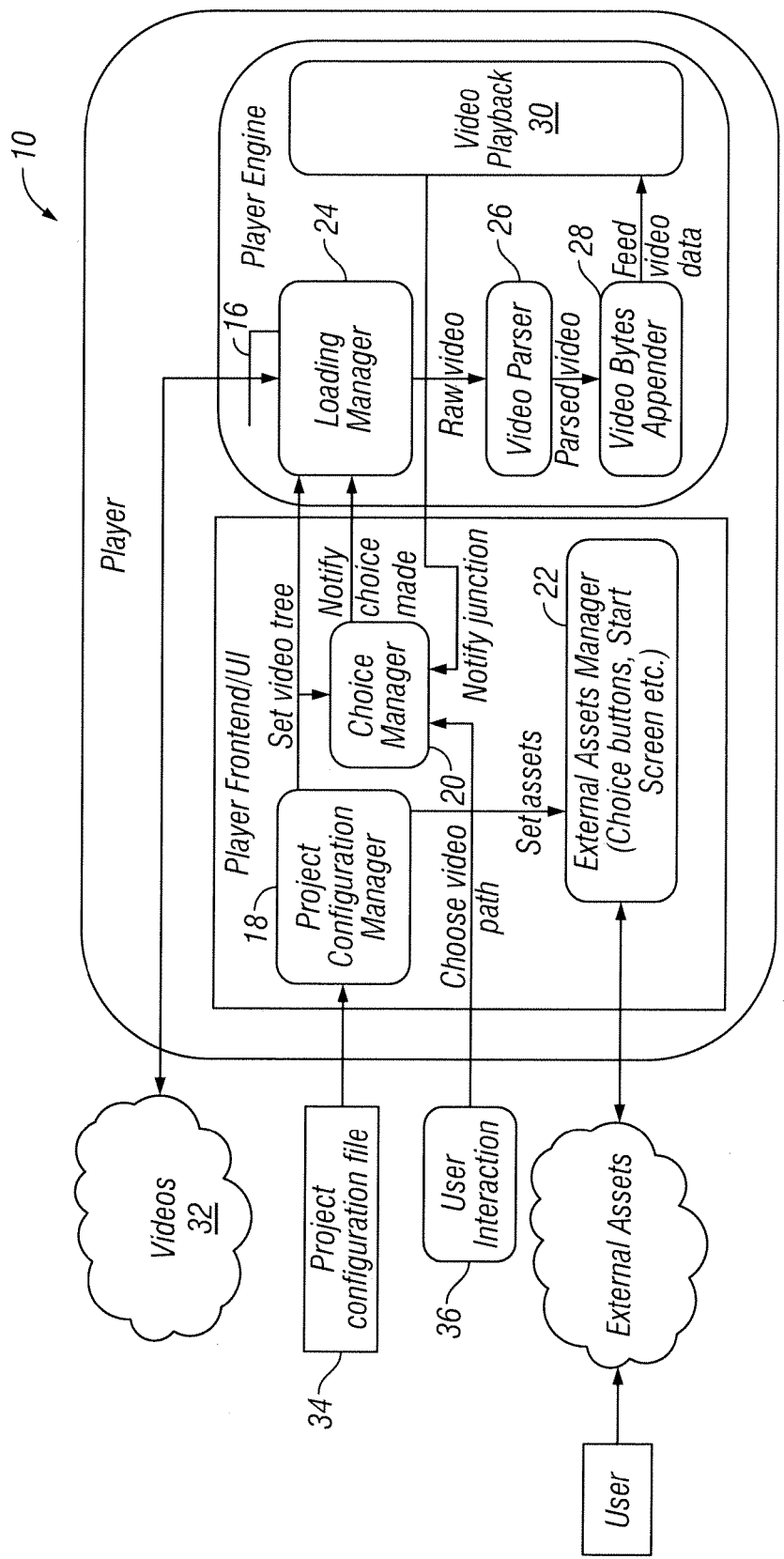
FIG. 1 illustrates one embodiment of an overall system architecture of the present invention.

Loading Manager—Is in charge of downloading web-based videos according to a certain loading logic. Gets a tree as input from the Project Configuration Manager, and is notified when user/system choices are made by the Choice Manager (for instance, in order to stop loading unreachable videos once a selection has been made).

Video Parser—Analyzes and modifies the raw video content, for instance, in order to concatenate two separate videos into a single timeline.

Also in charge of inserting cue points into the video stream (for instance, junction event).

Video Bytes Appender—Takes different parsed video streams and appends their bytes into a single stream of bytes which is then fed into the video playback.

Video Playback—Plays back the video for the user to watch. Also notifies of events using cue points that were embedded within the video stream by the Video Parser.

Player Frontend/UI

Project Configuration Manager—Manages all project specific configurations. Gets as input an external configuration files. The Project Configuration Manager notifies the Loading Manager of the tree structure and web-based video files, sets the Choice Manager's choices and the External Assets Manager's configuration.

Choice Manager—Accepts junction notifications from the Video Playback component, thus showing a user selection GUI (selection buttons). Listens for User Interaction and notifies the Loading Manager that a selection has been made.

External Assets Manager—Is in charge of the loading and displaying of all project specific external assets (for instance, start screen, play button, transport bar, choice buttons, end screen and more).

External Resources (Web Based)

Videos—Web-hosted video files

Project Configuration File—A file that outlines the entire project's data, including the tree structure, video files, external assets and any other project specific data.

External Assets—External web-based files that make up the project's start screen, end screen, choice buttons, transport bar and other visual objects.

Other

User Interaction—Any input by user (such as mouse click, keyboard input, gesture etc.).

The present invention provides systems and their methods to load several videos at the same time. With the present invention, the system does not know which video will be played and relies on user selection. The connection between the videos is sufficiently seamless so there is no time to load a video and then wait for the next one to be loaded and there are no jumps or cuts on connection points between videos.

With the system of the present invention, a plurality of videos are loaded, each having a plurality of segments that are a standalone video. In one embodiment, a user downloads various segments and these are then selected as segments to be loaded. A custom download is created.

In one embodiment, the system 10 includes a pre-loader 12 which loads some video before the user can start playing. This can be done on every player, which as a non-limiting example can be you-tube, Netflix, vimeo, and the like. A production company 14 creates the segments of the video A video created by the system 10 is an interactive video that offers the user the opportunity to make a choice, as the video is playing (i.e., without pausing/stopping the video), that affects the course of the video in real-time. In one embodiment, the video is non-linear with many segments connected by branches. A tree like structure is created with several video segments that can appear at the same time point based on how a user chooses to engage with the video. The video player has to be smart to control the way the segments are downloaded in that the video player considers all possible valid continuations of the video, and makes sure the video will be played until the end on all possible scenarios. The player can include other interactive elements including but not limited to, links, pop-ups text, pictures, animation, other videos and the like.

Referring to FIG. 1, the system 10 includes a player 16 with a project configuration manager 18, choice manager 20, external assets manager 22, a loading manager 24, a video parser 26, a video bytes appender 28 and a video playback 30. The player 16 communicates with videos 32, a product configuration file 34, user interaction and external assets 36. The external assets are design assets used for the design of an interactive layer.

The user can create the video through the use of a user device coupled to the system, including but not limited to, a computer, cell phone, such as Apple's iPhone, other portable electronic devices, such as Apple's iPod Touches, Apple's iPads, and mobile devices based on Google's Android operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of the user device may include but are not limited to persistent memories like flash ROM, random access memory like SRAM, a camera, a battery, LCD driver, a display, a cellular antenna, a speaker, a Bluetooth circuit, and WIFI circuitry, where the persistent memory may contain programs, applications, and/or an operating system.

Figure 2:
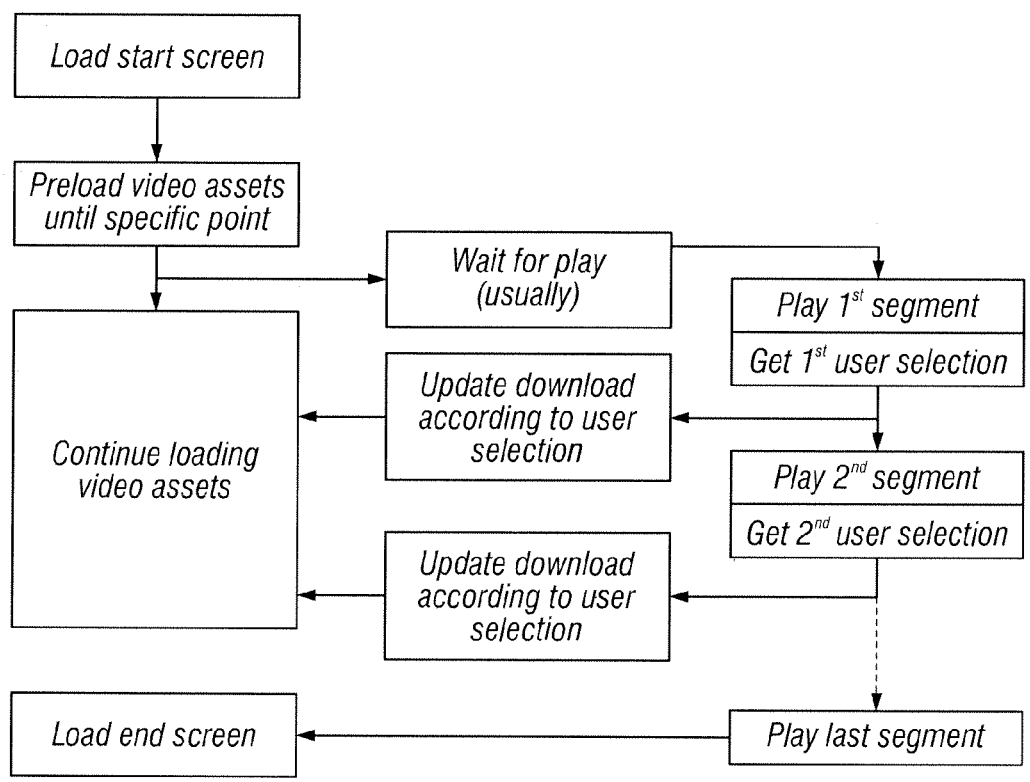
FIG. 2 is a flow chart illustrating one embodiment of downloading video segments and creating a custom video.

Referring to the flow chart of FIG. 2, a load start screen is used to preload video assets until a specific point. After pressing play the system plays a first segment, collect first user selection, then plays the second segment, collect the second user selection and plays the last segment. Following the first segment, an updated download is provided according to the user selection. Following the second segment, a download update is provided according to the user's selection, and so on.

The system 10 downloads a video and allows for the creation of multiple segments of video that can be linked together via branches. In certain embodiments, there can be virtually no limit to the number of segments and branches.

As a non-limiting example, a first segment can be the first ten seconds of a video. Two additional segments can be created for the next ten to twenty seconds, each coupled seamlessly to the first segment via an associated branch.

Figure 3:
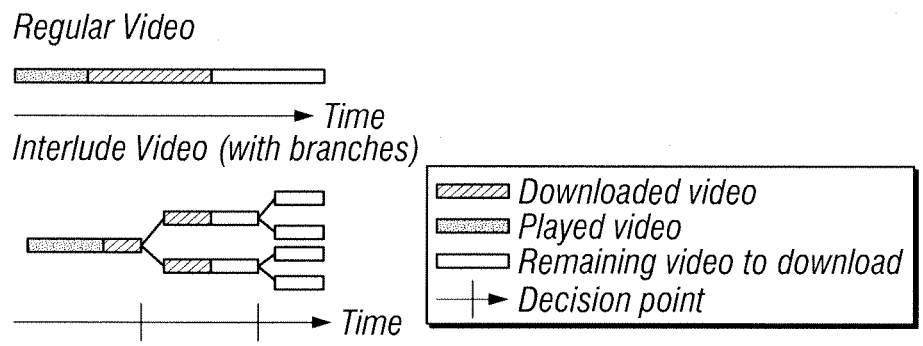
FIG. 3 is a diagram illustrating the differences between a regular video and a video of the present invention.

The downloading continues and the user selects the video it wishes to see. The system 10 then continues to download. In FIG. 3, the four rectangles on the right are different remaining segments.

With the present invention, several segments of videos are downloaded at the same time because the system does not know which will be played.

The diagram in FIG. 3 below illustrates the differences between a regular video and one created by the present invention. In FIG. 3, the regular video is represented as a played video, downloaded video and remaining video to be downloaded. With the video of the present invention, a downloaded video from a played video is the first segment. A decision point exists after the first segment where it branches into two second segments with remaining video to download. The remaining video to download branches from the respective two second segments.

When loading segments for the video, the system loads all possible segments that can be chosen by the user. These segments are either loaded, or their loading is initiated, prior to the connection point in order to ensure that the next segment is ready with all of its possible variations.

In one embodiment, the loader 12 loads all the possible paths and disregards paths that the user cannot reach once a particular video segment is selected and viewed.

Figure 4A:
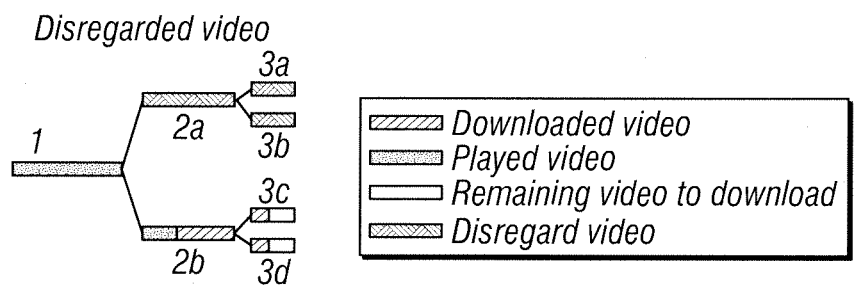
FIGS. 4(a) and 4(b) illustrate an embodiment of a sequence of downloading videos in an embodiment of the present invention.
Figure 4B:
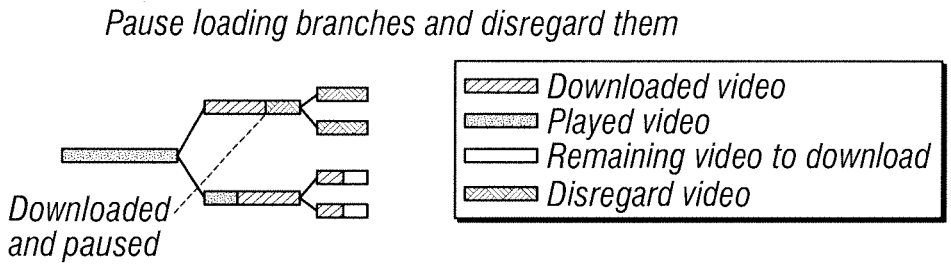

As a non-limiting example, illustrated in FIGS. 4(*a*) and 4(*b*), a sequence of loading is illustrated. Segment 1 is loaded. Segments 2*a*, 2*b* are then loaded. The user selects option 2*b*. Segment 2*a* is then disregarded with its entire branch and segment 2*b* is loaded. Segments 3*c* and 3*d* are also loaded.

If the system 10 already started loading segment 2*a*, and the user then selects option 2*b*, the system 10 stops loading 2*a*, as illustrated in FIG. 4(*b*).

In one embodiment, video segments are pre-loaded in order to give the loader a head start and ensure a seamless video viewing experience. The pre-loader 12 knows how to dynamically calculate the internet speed for an individual user and how much to preload at the start before the video begins to play in order for the video to be played without the video stopping and resuming only after it loads more content, e.g., buffering. The system 10 reduces the chance for buffering so the video won't stop. The preload can be configured to any amount of time needed by the video creator. As a non-limiting example, with a very fast internet connection, the system and method of the present invention can preload a very small amount of video before playing and knows that the system manages loading all the rest of the videos before playing them on every possible branch.

When the system 10 knows that an internet connection is slow, more video time is loaded before playing otherwise the player tries to play video that was not downloaded yet (buffering).

Figure 5:
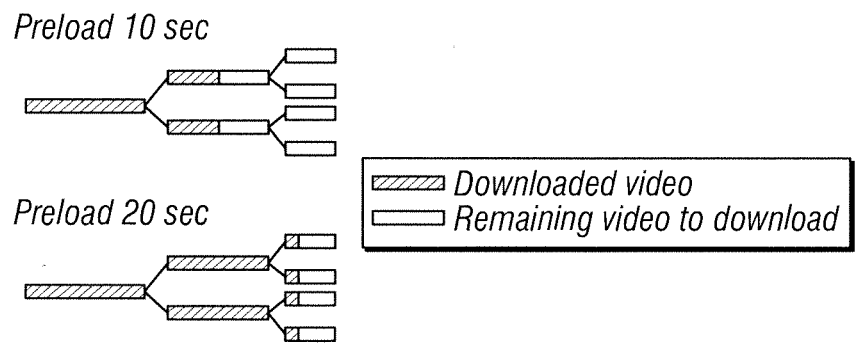
FIG. 5 illustrates an embodiment of the present invention with two possible values for preloading time.

FIG. 5 illustrates an embodiment with two possible values for preloading time.

The loader 12 optimizes the net bandwidth utilization to download additional video content according to an individual user's bandwidth constraints in order to continue downloading video. As a non-limiting example, this can occur after the preload and before a user presses play, or when the video is paused. Optimization is achieved by continuing loading during this "dead time" before the user pressed play so more video time is loaded and the chance for buffering is reduced.

After the video starts to play, the loader 12 continues downloading all of the video segments it can until it has nothing left to download. The loader 12 has a map of all existing videos, knows the length of each segment and the possible options to continue. The loader 12 downloads all possible videos until reaching the last segment on every possible branch.

Figure 6:
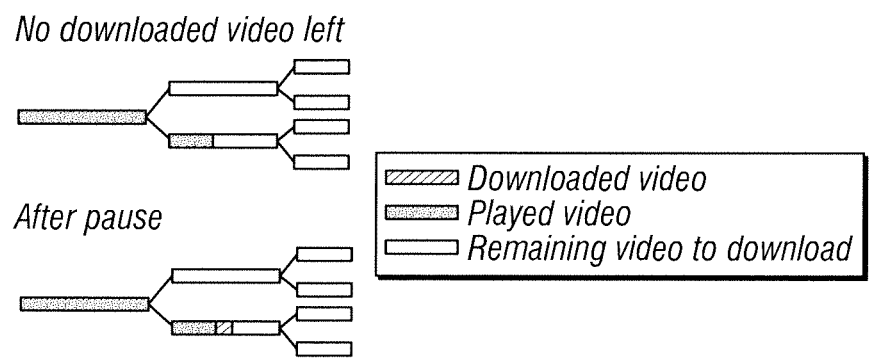
FIG. 6 illustrates an embodiment of the present invention where a loader downloads additional video segments to play and once a threshold is reached the video continues playing.

The downloading speed can be affected by many factors including but not limited to, computer status, service provider, video hosting, programs running in the background, net congestion and the like. If, however, during the video, the player played all of the segments of the video that were successfully downloaded, and the loader still didn't manage to load more content to play or if the amount of downloaded video that remains is less than a minimum threshold, the system 10 will enter a buffering state. The video playback pauses, the loader 12 downloads additional video segments to play, and after a certain threshold is reached, the video continues playing, as illustrated in FIG. 6.

At the end of the played video, the loader 12 can download more video segments that were effectively discarded during the last play. These video segments can be used for the next play. This provides for optimization. When the system 10 loads more segments in current playback it has less to load on the next play and this significantly reduces the next loading time.

Figure 7:
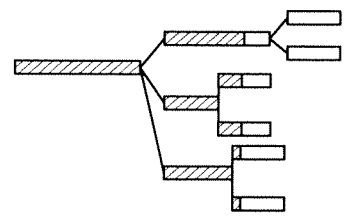
FIG. 7 illustrates an embodiment of the present invention illustrating that the loader can have priorities.
Figure 7:
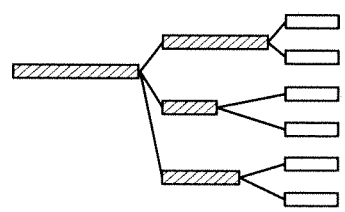
Figure 7:
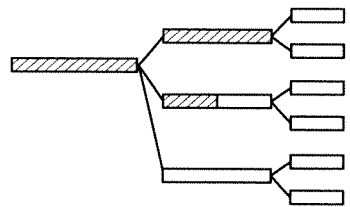
Figure 7:
Figure 7:
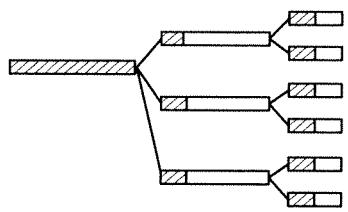
Figure 7:
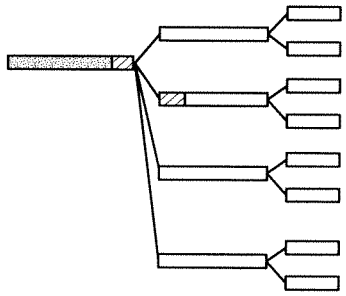

Referring to FIG. 7, in one embodiment of downloading order, the loader 12 can choose how to download the video segments and in what order. In one embodiment, the same amount of play time is loaded for each segment. This can be the default setting. In another embodiment, all videos are loaded until the end of certain segments and can be used when segments have different lengths for each variation. In another embodiment, segments are loaded by order of importance or popularity. This can be, by way of a non-limiting example, knowing which branch is more likely to be played. In another embodiment, only the start of each segment or selected segments are loaded. In another embodiment, loading is done only after a specific segment is selected, such as, by the non-limiting example, if there is a very large amount of variation for the same segment.

The loader 12 has priorities for every segment and decides what to load according to the priorities and the user bandwidth. The first priority is what is currently playing. The second priority is the next segment and prioritization between all of the subsequent segments according to popularity or importance. The third priority is the segments beyond the next segment, e.g, subsequent segments, or segments that can be jumped to.

The loader 12 can choose not to download all the segments but only a subset of them. Each segment has some kind of "Is_loadable" variable that indicates if the segment should be loaded or not.

This can occur in several scenarios. In one, if options are effectively chosen in advance, as a non-limiting example if a user enters its gender in the beginning, and the impact of that option only appears later during the video play. Another scenario is if the system 10 makes a choice according to information that was not directly inputted by the user, such as IP address, social network ID, additional identifiers, and the like. Additionally, the system 10 can load only the most likely segments to be played and loads them unless the user chooses differently In terms of which segments to load.

In another embodiment, the loader 12 can have other logic that controls the process differently, where logic is another part of the player that can control the loader 12 by defining the "Is_loadable" variable for each segment. The system 10 can allow the user to play the video with certain segments on the first viewing and different segments on the second viewing such that the loader 12 acts accordingly.

In another embodiment, another scenario is after a user interacts with a video and makes certain choices associated with the video. In this scenario the user can share his/her passive version of the video with others (i.e., a third party would not be able to make choices and would only watch the video as the choices were selected by the initial user). In this "passive mode," the video plays only the selected sequence of video segments and the loader 12 only downloads those segments. However, when the loader 12 completes the required downloads, it can start downloading the other video segments in the background, while the video is playing, for potential active mode by the new user.

The system 10 can also provide support for download pause and resume feature. This feature set includes a way to pause a download, save the partial data that was already downloaded, and, at a later time, continue downloading from the same point on all branches.

The system 10 allows for download pause and resume. In one embodiment, this is achieved by adding a "Range" field to an HTTP request. However, Flash does not allow this field to be added to an HTTP request due to security restrictions. The HTTP "Range" field, as defined by RFC 2616, section 14.35, allows the retrieval of a sub-range of bytes of the requested file, thus allowing a download of partial data, or resuming of a partially downloaded file from the place we left off.

In order to get around this security restriction, the system 10 implements a more low-level form of communication instead of using the standard feature set that Flash provides. Because the standard Adobe Flash API for HTTP requests does not allow addition of the "Range" header to an HTTP request, the system 10 avoids using the standard API and implements its own HTTP client.

Figure 8:
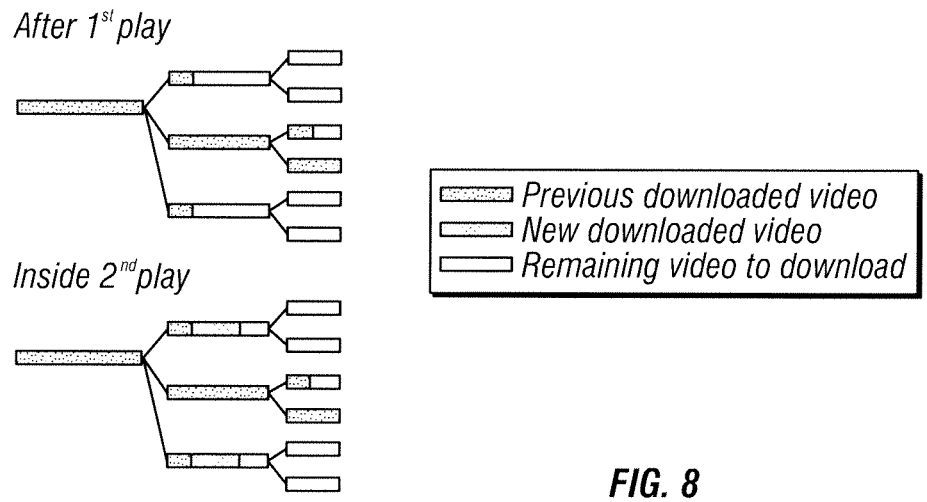
FIG. 8 illustrates an embodiment of the present invention with socket communication.

Referring to FIG. 8, in one embodiment, socket communication is used to implement HTTP communication and partial downloads are manually saved to an array of bytes, also known as ByteArray. With this method, the system 10 pauses a download, saves partial data, and later sends an HTTP request with a "Range" field, so that the download restarts at the correct offset. The new incoming data is appended in the ByteArray. This is useful to system 10 player's loading logic because one can now pause video stream downloads which are not currently needed, but may be required later in playback or replay, without re-downloading the entire file. This increases efficiency and avoids redundant network traffic and processing. In another embodiment, the system re-downloads the entire dropped file from the beginning and dumps the partial data that was downloaded. However, this can be wasteful.

Figure 9:
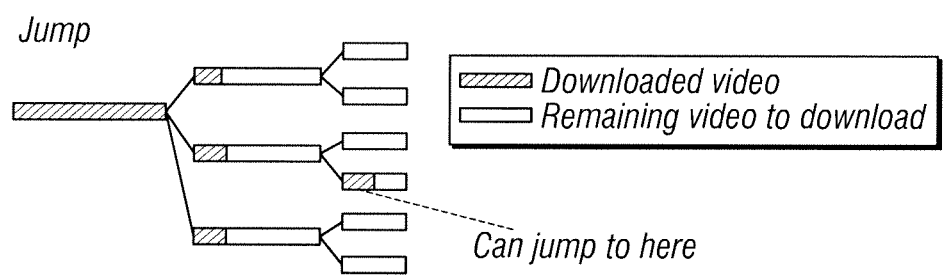
FIG. 9 illustrates an embodiment of the present invention with a jump feature.

In various embodiments, the system 10 provides a jump feature, illustrated in FIG. 9. In some videos the user can jump to a different part of the tree. As a non-limiting example, if the character dies or the user wishes to skip a part, then the loader 12 downloads the destination part in order to prevent buffering on such a jump. Because every segment has its own priority, the loader 12 can have a high priority for a distant segment. The user then starts loading before loading closer segments. In order to ensure that if the user will decide to jump to this segment it will already be loaded.

Figure 10:
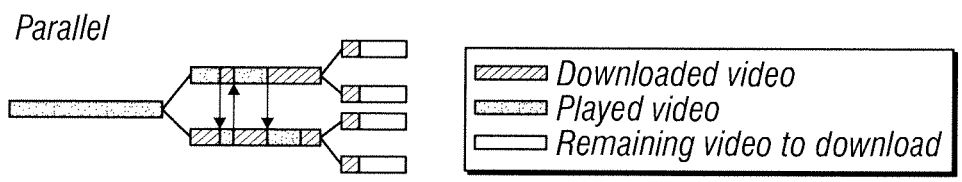
FIG. 10 illustrates an embodiment of the present invention showing that the user interacts with videos in real time.

Referring now to FIG. 10, in some videos the user can move back and forth between two or more branches. This means that the loader 12 does not pause the loading of the segments that were not selected since they can still be used. Back and forth movement is achieved in the same manner. The options always appear on the screen and the two videos are played simultaneously, and the loader 12 needs to download both parallel segments.

In various embodiments, the user interacts with videos of the present invention in real-time while the video is playing. This user can interact with the video with any known variety of mechanisms, including but not limited to, mouse clicks, mouse movement, eye movement, keyboard and the like.

In various embodiments, the segments, even if offered at a single decision point, can have different lengths. As a non-limiting example, a user can choose between segment A1 or A2 where A1 and A2 have different lengths. A decision point is not limited to a binary option. The number of decision point options can be larger and a segment can continue to any number of presented options.

With the present invention, the interactive nature of a video impacts the video's content and the user can control the video's path. With the present invention, every option changes something on the video content. With the present invention, moving from one video segment to the next can take some time and can also be immediate upon clicking the desired option, with virtually no delay from the time a decision is made to the playing of the associated video segment. In most instances, the options are selected by the user. However, in some circumstances the system 10 can select the options for the user. As non-limiting examples this can be by IP, physical location, weather, user id and the like. The video can also include personal data inside the video.

The player can be used on any device that displays video and enables user engagement including but not limited to, personal computers, tablets, cellular phones, music players and the like.

The player can includes an interactive layer on top of the video. This layer presents output to the user, such as option buttons, a clock and the like, and collects the input from the user. Interactive elements on the interactive layer can be different for each video segment to provide that when a new segment is loaded and played the player can add the appropriate interactive elements to it.

Expected variations or differences in the results are contemplated in accordance with the objects and practices of the present invention. It is intended, therefore, that the invention be defined by the scope of the claims which follow and that such claims be interpreted as broadly as is reasonable.

The invention claimed is:

1. A system for facilitating the selective presentation of video content, wherein the video content is comprised of a collection of segments, the system comprising:
    a video loading manager for selectively determining a subset of the collection of segments to download, wherein the determination is based, at least in part, on a download priority.

2. The system of claim 1 wherein the collection of segments is organized according to a tree structure comprising decision points at which one of a plurality of segments may be selected for downloading and viewing such that only certain segments remain potentially viewable.

3. The system of claim 2 wherein the download priority is based at least in part on the location of the currently viewed segment in the tree structure and which subsequent segments are connected to the currently viewed segment within the tree structure.

4. The system of claim 1 wherein the download priority is based at least in part on the popularity of the subsequent segments among previous viewers of the video content.

5. The system of claim 1 wherein the download priority is based on one or more user characteristics.

6. The system of claim 5 wherein the user characteristics comprise one or more of a gender, an age, a location, and a prior viewing history.

7. The system of claim 1 wherein the video loading manager further initiates downloading of the subset of video segments prior to the completion of a currently viewed segment according to the download priority.

8. The system of claim 7 further comprising a video appender module for appending downloaded segments to each other, thereby creating a seamless stream of the video content.

9. The system of claim 7 wherein the video loading manager further initiates downloading of more than one video segment simultaneously.

10. The system of claim 7 further comprising a pre-loader module for starting downloading prior to the playing of the first segment.

11. The system of claim 10 wherein the pre-loader module varies downloading speeds of each of the subset of video segments based at least in part on a bandwidth statistic.

12. The system of claim 7 further comprising a video player, wherein the downloaded video segments are rendered in the video player for presentation to a user.

13. A method for selectively presenting video content, wherein the video content is comprised of a collection of segments, the method comprising the steps of:
    selectively determining a subset of the collection of segments to download, wherein the determination is based, at least in part, on a download priority; and
    initiating downloading of the subset of video segments prior to the completion of a currently viewed segment according to the download priority.

14. The method of claim 13 wherein the collection of segments is organized according to a tree structure comprising decision points at which one of a plurality of segments may be selected for downloading and viewing such that only certain segments remain potentially viewable.

15. The method of claim 14 wherein the download priority is based at least in part on the location of the currently viewed segment in the tree structure and which subsequent segments are connected to the currently viewed segment within the tree structure.

16. The method of claim 13 wherein the download priority is based at least in part on the popularity of the subsequent segments among previous viewers of the video content.

17. The method of claim 13 wherein the download priority is based on one or more user characteristics.

18. The system of claim 17 wherein the user characteristics comprise one or more of a gender, an age, a location, and a prior viewing history.

19. The method of claim 13 further appending the downloaded segments to each other, thereby creating a seamless stream of the video content.

20. The method of claim 13 wherein more than one video segment are downloaded simultaneously.

21. The method of claim 13 further comprising varying downloading speeds of each of the subset of video segments based at least in part on a bandwidth statistic.

* * * * *